Dec. 22, 1964  A. A. BLOOMFIELD ETAL  3,161,914
SPINNERETS FOR PRODUCING HETEROFILAMENTS
Filed July 30, 1962  2 Sheets-Sheet 1
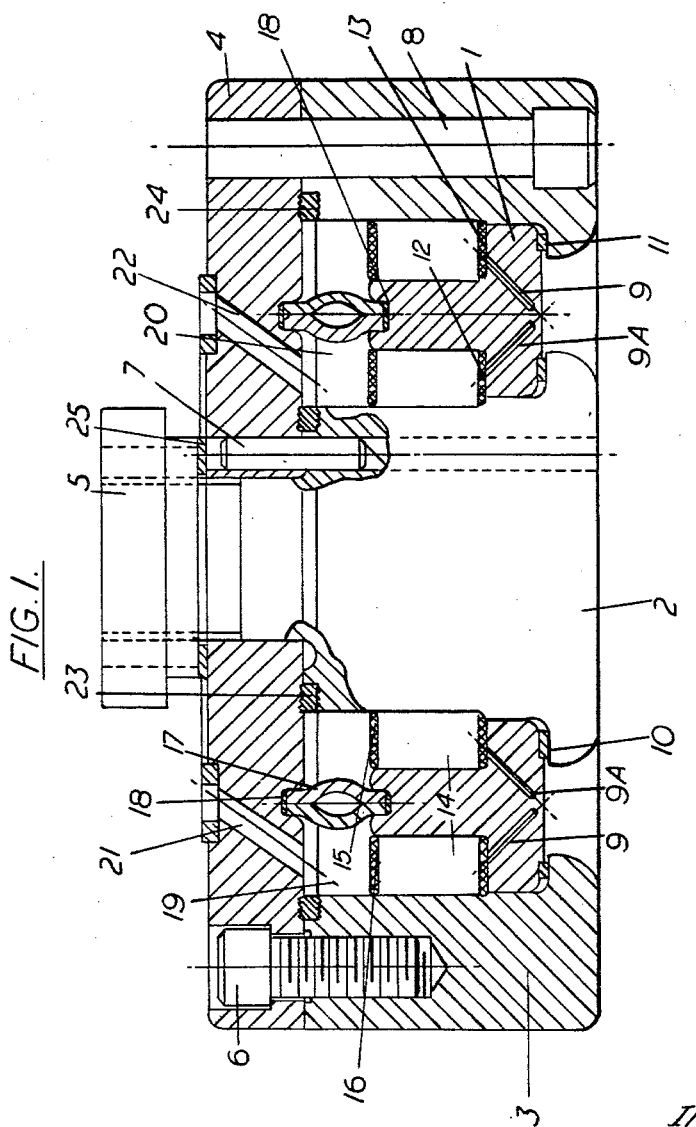
INVENTORS
ALLAN ARTHUR BLOOMFIELD
JOHN ANTHONY CARTER
GEOFFREY HUGH JONES
JAMES SAUNDERS
JOHN GILBERT SEARLE
By
Cushman, Darby & Cushman
Attorneys

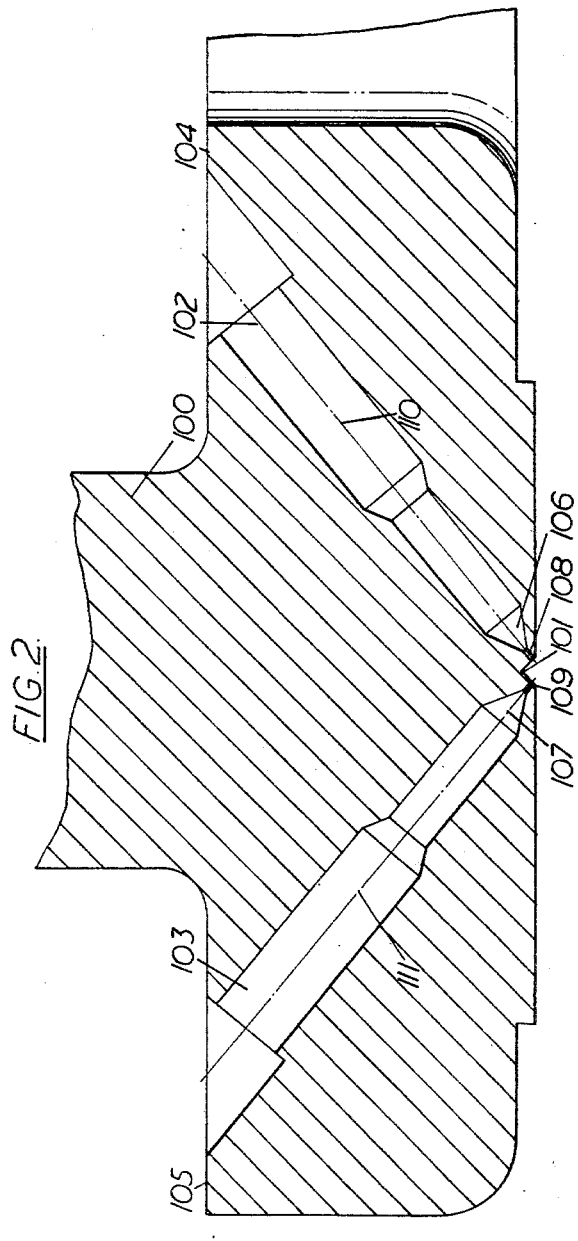

United States Patent Office 3,161,914
Patented Dec. 22, 1964

3,161,914
SPINNERETS FOR PRODUCING HETEROFILAMENTS
Allan Arthur Bloomfield, Monmouth, John Anthony Carter, Newport, Geoffrey Hugh Jones, Abergavenny, James Saunders, Glascoed, near Pontypool, and John Gilbert Searle, Cannock, England, assignors to British Nylon Spinners Limited, Pontypool, England
Filed July 30, 1962, Ser. No. 213,544
Claims priority, application Great Britain July 28, 1961
4 Claims. (Cl. 18—8)

This invention is concerned with improvements in or relating to heterofilaments and their production. By heterofilament is to be understood a composite filament comprising two or more segments of polymers varying as to their chemical constitution, composition or degree of polymerisation fused together in eccentric relationship, e.g. in side-by-side relationship.

Spinnerets and processes provided by this invention are primarily intended for application to synthetic high molecular weight fibre forming polymers which can be melt spun, for example polycondensation polymers such as polyamides, polyesters, polyesteramides, polyurethanes and polyureas and addition type polymers such as polyhydrocarbons. It is to be understood, however, that the invention may also be applied to polymers which are normally dry-spun or wet-spun, for example polyacrylonitrile.

The production of heterofilaments in which two different fibre forming polymers are simultaneously extruded through the same spinneret orifice is known in the art. However, this has the disadvantage that the two polymers may not always be extruded at the same rate and hence the filament produced may not be consistent with regard to the relative amounts of the polymers present. Furthermore, there is the possibility that the two polymers may become mixed together immediately prior to extrusion, giving a filament in which there is no detectable boundary between the polymers.

One of the various objects of the present invention is to provide a spinneret in which these undesirable features are at least largely overcome. In such a spinneret the simultaneous extrusion of two different molten polymers is caused to take place through adjacent orifices which are so angled that the filaments produced meet at a point near to the face of the spinneret and coalesce to form a single heterofilament of constant composition with respect to the two polymers.

Accordingly, therefore, one of the several features of the present invention relates to a spinneret for the extrusion of heterofilaments comprising a plate having an upstanding flange associated therewith, such that the spinneret exhibits an inverted T-shaped cross-section, in which extrusion orifices are formed in each of the horizontal arms of the inverted T and angled so that the medium lines of at least one orifice from each side of the upstanding flange intersect at a point near the outer face of the spinneret, the spinneret being enclosed by a housing adapted to direct polymer streams one to each side of the upstanding flange.

More particularly the invention relates to a spinneret comprising an annular plate having an upstanding flange integral therewith, exhibiting an inverted T-shaped radial cross-section.

There will now be described with reference to the accompanying drawings a spinneret and housing according to this invention which description is given by way of illustration rather than by way of limitation of the invention.

In the drawings FIGURE 1 is a cross-sectional view of a spinneret and pack through two pairs of orifices and FIGURE 2 is a cross sectional view of a preferred design of annular spinneret plate having an upstanding flange taken through one pair of orifices only.

In said FIGURE 1, 1 is the spinneret, 2 centre piece, 3 outer case and 4 cover, all of which components are preferably made from stainless steel. The cover is located on the centre piece by a dowel 7 and secured by pack nut 5, the recessed bolts 6 secure the outer case to the cover. The complete assembly is secured to a pump bracket, or other suitable point, by means of recessed bolts which pass through the holes 8 in the outer casing.

The spinneret 1 comprises an annular plate with an upstanding flange exhibiting an inverted T-shaped radial cross-section. Pairs of orifices, 9 and 9A, are drilled in the inner and outer ledges of the inverted T, from points on a radius, at equal angles to the horizontal and in a vertical plane. The points at which the drillings start are adjusted so that the orifices are directed towards a point just below the face of the spinneret and on a line passing through the centre of the upstanding flange of the spinneret. The spinneret is positioned between the centre piece 2 and outer casing 3 on seals, 10 and 11, which may be made of aluminium or some other suitable material. Annular spaces 14, above bottom inner and outer screens 12 and 13 and between the spinneret 1 and centre piece 2 and the spinneret and outercase 3, are packed with sand or some other suitable filtering medium and on top of which are placed top inner and outer screens 15 and 16. The top of the upstanding flange of the spinneret and the underside of the cover are recessed to take a partition 17 and sealing gaskets 18. The partition 17 which comprises two mutually outwardly bowed endless flexible strips divides the space above the spinneret and top screens into two annular spaces 19 and 20 into which polymers can be introduced via inlet ports 21 and 22 in the cover. 23 and 24 are centre piece and outer case sealing rings respectively which may be of aluminium or some other suitable material.

If, owing to a blockage occurring in the sand packs or extrusion orifices, pressure builds up in the annular space on one or other side of the partition 17, this partition is compressed and tends to flatten thus exerting a greater pressure on the gaskets 18 to provide an improved seal between the cover and the upstanding flange of the spinneret thus preventing polymer leaking from one annular space to the other. A further function of partition 17 is as follows. Under pressure, the spinneret seals 10 and 11 are compressed so that the spinneret moves downwards. This would result in a leak at gaskets 18, but the bowed sides of partition 17 are automatically flattened slightly by the pressure exerted by the polymer streams and the resulting increase in height of 17 maintains the sealing load on gaskets 18.

The preferred design of annular spinneret plate with an upstanding flange, 100, shown in FIGURE 2, has an annular V-groove 101 cut in the face of the spinneret plate. Stepped holes 102 and 103 pass through the inner and outer ledges 104 and 105 of the spinneret plate 100 at angles of 41° to the horizontal such that their median lines 110, 111 are at right angles to the sides of the groove 101 and meet at a point within the groove 101 and on the vertical axis of the spinneret plate. Holes 102, 103 terminate in frusto-conical portions 106, 107 joining the orifices 108 and 109 which pass substantially at right angles through the sides of the groove 101. The said groove has a depth of approximately twice the diameter of the orifices 108, 109 and has sides of substantially equal length which are at an angle of 82° to each other; the apex of the groove lying on the vertical axis of the spinneret plate.

The effect of cutting a groove in the face of the spinneret plate is to enable greater precision to be obtained in the drilling of the orifices, since the sides of the groove present a face at right angles to the direction at which the orifices are to be drilled. Thus more uniformly fused heterofilaments are produced which have little tendency to spiral.

Although this invention has been described with particular reference to a spinneret comprising an annular plate with an upstanding flange, it is immediately apparent that the spinneret may, for example, comprise a circular or elliptical plate with an upstanding flange which lies along a diameter in the former instance and along the longer axis of the ellipse in the latter instance. The upstanding flange need not be integral with the spinneret plate and may be merely in the form of a dividing plate.

The shape of the cross-section of the heterofilament produced by the spinneret of this invention may be varied by varying the distance apart of the centres of the extrusion orifices. Thus, for example if the extrusion orifices 9 and 9A of FIG. 1 have a diameter of 0.013 inch and are formed such that their centres are 0.0065 inch apart so that they form a single orifice at the outer surface of the spinneret plate, then the heterofilament produced by extruding two polymers through these orifices will be substantially circular in cross-section. If the distance apart of the centres is greater than 0.0065 inch but less than about 0.018 inch then the heterofilament will have an approximately elliptical cross-section, at about 0.018 inch and above the heterofilament will have a cross-section in the shape of a dog-bone.

The shape of the cross-section of the heterofilament may, of course, also be varied by forming orifices in the spinneret having a non-circular cross-section.

It is not intended that the spinneret of this invention be limited to the production of heterofilaments comprising only two components in a side-by-side relationship, since by forming two pairs of orifices at suitable angles a heterofilament having a quadrilobed cross-section may be produced.

In a process for the manufacture of heterofilaments using the spinneret of this invention molten polymers, obtained by remelting polymer chip or directly from continuous polymerisation apparatuses for example, are introduced via suitable metering pumps through inlet holes 21 and 22 in the cover 4, FIGURE 1, into the annular spaces 19 and 20. The polymers are filtered by the sand packs 14 and extruded through the orifices 9 and 9A into filaments which meet and coalesce at a point just below to the face of the spinneret to yield a heterofilament which is drawn down and wound up on a conventional winding apparatus. In order that the polymers do not solidify in the spinneret filter pack the whole spinneret assembly is maintained at a temperature above that of the highest melting polymer in a known manner.

Heterofilaments produced by this process may, during their passage from the spinneret to the wind up, be cooled by a transverse blast of air and if desired, passed through a steam conditioner tube of suitable length. Other known methods of cooling the filaments such as quenching in water may also be employed.

This invention therefore, also includes a process for the manufacture of heterofilaments from high molecular weight polymers wherein the components which are to constitute the heretofilaments are extruded through respective orifices arranged on opposite sides of a spinneret having an upstanding flange, the orifices being angled such that the filaments meet and coalesce to form a heterofilament, comprising at least one of each of the said components, at a point near to the outer face of the spinneret and are then drawn down and wound up in a known manner.

By attenuating the as spun filaments in a known manner such that at least one of the components constituting the heterofilament is thereby oriented, a potential crimp is imparted to the filament. Preferably the as spun filaments should be drawn by at least 300%. The potential crimp in the drawn filaments may be developed by subjecting them to a heat relaxing treatment; thus by passing them for example over a heated plate and subsequently relaxing a tight helical crimp is produced.

The polymers used in the process of the invention may comprise two polymers having the same repeat unit, that is two polymers which are chemically identical, but varying in their relative viscosities; two different polycondensation polymers, for example a polyamide and a polyester; a polycondensation polymer and an addition type polymer, for example a polyamide and a polyhydrocarbon or any other suitable combination of polymers.

The aforementioned term relative viscosity is defined as:

$$\frac{t_1 \times d_1}{t_2 \times d_2}$$

where $t_1$ = time taken for a known volume of solution of polymer, density $d_1$ to flow between two marks on a standard U-tube viscometer, $t_2$ = time taken for an equal volume of solvent, density $d_2$, to flow between the same marks at the same temperature.

One or each of the polymers constituting the heterofilaments obtained by the process of this invention, may if desired, contain a colour forming pigment. The yarn so obtained will when made into a fabric impart to that fabric a colour being a blend of the colours imparted by the pigments to the individual components constituting the heterofilament.

The following examples illustrate the process of this invention but are not intended to be in any way limitative thereof.

*Example 1*

Molten poly-epsilon-caprolactam at 265° C. having a relative viscosity of 32 (measured at a concentration of 8.4% by weight of polymer in 90% formic acid solution at 25° C.) and containing 0.5% $T_1O_2$, and molten poly-epsilon-caprolactam at 275° C. having a relative viscosity of 70 are metered into inlet ports 21 and 22 respectively of the spinneret assembly shown in FIGURE 1. The aforesaid spinneret assembly is maintained at a temperature of 275° C. and the polymers extruded through orifices 108 and 109 of FIG. 2, which have a diameter 0.013 inch, whence they coalesce to form composite filaments which are cooled by a transverse blast of air and wound up at 2000 f.p.m. The as-spun filaments have an elliptical cross-section composed of equal parts of each of the two components.

The as-spun yarn is cold drawn at a draw ratio of 3.6: the filament denier of the drawn yarn is 10 and it has a tenacity of 4 g.p.d. at an extension of 23%.

The drawn yarn is of a low crimp level only but after relaxing in hot air a tightly coiled helical crimp having a crimp frequency of 30 c.p.i. is obtained.

*Example 2*

Molten polyhexamethylene adipamide and molten poly-epsilon-caprolactam, relative viscosities 32 and 33 measured as in Example 1, are respectively metered into inlet ports 21 and 22 of the spinneret assembly and extruded in the form of heterofilaments as in Example 1, the spinneret assembly being maintained at 280° C. The extruded heterofilaments are cooled by a transverse air blast and wound up at a speed 1012 f.p.m. giving a yarn having an undrawn filament denier of 40.

After cold drawing at a speed of 300 f.p.m. at a draw ratio of 4.73 an 8 d.p.f. yarn having a tenacity of 5.1 g.p.d. and an extension of 20% is obtained.

The drawn yarn is in an uncrimped state but on relaxing in hot air a uniformly bulked yarn is obtained.

A fabric made from this yarn on a weft knitting machine had a warmer handle and better covering power than fabric knitted from an uncrimped polyhexamethylene adipamide yarn.

*Example 3*

Two streams of molten poly-epsilon-caprolactam, one containing 1.0% by weight of black pigment and the other 0.5% by weight $Ti O_2$ are respectively metered into inlet ports 21 and 22 of the spinneret assembly, which is maintained at a temperature of 275° C., and extruded through their respective orifices to yield heterofilaments which are cooled by a transverse blast of air and wound up at 1548 f.p.m.

The as-spun yarn was cold drawn at a draw ratio of 3.52 to yield a yarn which, in cross-section, is composed of equal proportions of black and white polymers in a side-by-side relationship.

A fabric knitted from this yarn on a weft knitting machine appears as an overall shade of grey in colour.

What we claim is:

1. A spinneret for the extrusion of heterofilaments comprising: a housing having an aperture therein; a spinneret plate closing said aperture, said plate exhibiting an inverted T-shaped cross-section and forming with said housing two chambers divided by the upstanding flanges of the inverted T, said plate having extrusion orifices formed at an angle in each of the horizontal arms of the inverted T on opposite sides of the upstanding flange, the median lines of at least one orifice from each side of the upstanding flange intersecting at a point near the outer face of said plate, said plate having an annular groove cut in the face thereof, the sides of said groove being substantially at right angles with the median lines of said orifices at the points of intersection therewith; and means for directing a polymer stream to each of said chambers whereby the polymers which are simultaneously extruded through the orifices having intersecting median lines meet and coalesce after such extrusion to form a single heterofilament.

2. A spinneret according to claim 1 wherein the median lines of each of at least one orifice from each side of the upstanding flange intersect at a point just below the face of the spinneret plate.

3. A spinneret for the extrusion of heterofilaments comprising: a housing having an aperture in each end thereof; a cover closing one of said apertures; a spinneret plate closing the other of said apertures, said plate exhibiting an inverted T-shaped cross-section and forming with said housing two chambers divided by the upstanding flange of the inverted T, said plate having extrusion orifices formed at an angle in each of the horizontal arms of the inverted T on opposite sides of the upstanding flange, the median lines of at least one orifice from each side of the upstanding flange intersecting at a point near the outer face of said plate; a fluid-tight dividing partition forming two substantially concentric annular spaces within the housing, said partition comprising two mutually outwardly bowed endless flexible strips located in recesses in the underside of said cover and in the top of said upstanding flange, one of said annular spaces communicating via filtering means with the orifices formed in one of said arms of the inverted T and the other of said annular spaces communicating via filtering means with the orifices formed in the other of said arms; and means for directing a polymer stream to each of said chambers whereby the polymers which are simultaneously extruded through the orifices having intersecting median lines meet and coalesce after such extrusion to form a single hetero-filament.

4. A spinneret assembly according to claim 3 wherein the partition is maintained fluid-tight by the pressure exerted on the outwardly bowed endless flexible strips by the polymer streams.

References Cited in the file of this patent

UNITED STATES PATENTS

| 2,386,173 | Kulp et al. | Oct. 2, 1945 |

FOREIGN PATENTS

| 628,660 | Canada | Oct. 10, 1961 |
| 536,574 | Germany | Oct. 27, 1931 |